US011712876B2

(12) United States Patent
Watanabe et al.

(10) Patent No.: US 11,712,876 B2
(45) Date of Patent: Aug. 1, 2023

(54) DECORATIVE HOUSING AND MANUFACTURING DEVICE FOR SAME

(71) Applicants: Nissha Co., Ltd., Kyoto (JP); Art & Tech Co., Ltd., Tokyo (JP)

(72) Inventors: Yasushi Watanabe, Tokyo (JP); Hideharu Johno, Tokyo (JP); Yasuhide Fukada, Kyoto (JP)

(73) Assignees: Nissha Co., Ltd., Kyoto (JP); Art & Tech Co., Ltd., Tokyo (JP)

( * ) Notice: Subject to any disclaimer, the term of this patent is extended or adjusted under 35 U.S.C. 154(b) by 678 days.

(21) Appl. No.: 16/342,955

(22) PCT Filed: Oct. 5, 2017

(86) PCT No.: PCT/JP2017/036316
§ 371 (c)(1),
(2) Date: Apr. 17, 2019

(87) PCT Pub. No.: WO2018/074248
PCT Pub. Date: Apr. 26, 2018

(65) Prior Publication Data
US 2019/0291399 A1    Sep. 26, 2019

(30) Foreign Application Priority Data
Oct. 21, 2016    (JP) .................... 2016-218427

(51) Int. Cl.
*B32B 27/12*    (2006.01)
*B29C 33/12*    (2006.01)
(Continued)

(52) U.S. Cl.
CPC .............. *B32B 27/12* (2013.01); *B29C 33/12* (2013.01); *B29C 45/14* (2013.01);
(Continued)

(58) Field of Classification Search
CPC .................... B32B 27/12; B32B 5/022; B32B 2307/4023; B32B 2260/021;
(Continued)

(56) References Cited

U.S. PATENT DOCUMENTS 5,255,155 A * 10/1993 Sugimoto ........... B60R 16/0239
361/752
5,599,608 A *  2/1997 Yamamoto ............ B29C 43/021
264/46.7
(Continued)

FOREIGN PATENT DOCUMENTS

DE    202009001216 U1    4/2009
DE    102012023135 A1    5/2014
(Continued)

OTHER PUBLICATIONS

Espacenet Translation of JP-2002326319-A (Year: 2021).*
Poomalai, P., and B. Ramaraj. "Thermal and mechanical properties of poly (methyl methacrylate) and ethylene vinyl acetate copolymer blends." Journal of applied polymer science 106.1 (2007): 684-691. (Year: 2007).*

*Primary Examiner* — Michael Zhang
(74) *Attorney, Agent, or Firm* — Thorpe North & Western

(57) ABSTRACT

A housing included in a home appliance and used as a decorative housing is shaped like an inverted tray and includes a wood layer, a non-woven cloth layer bonded to the wood layer via a bonding resin layer, and a substrate resin layer fixed to the wood layer while infiltrating gaps between fibers in the non-woven cloth layer. A predetermined cutout pattern is formed on a colored coating film applied to a front surface of the non-woven cloth layer.

9 Claims, 5 Drawing Sheets

(51) Int. Cl.
*B29C 45/14* (2006.01)
*B32B 27/00* (2006.01)
*B32B 5/02* (2006.01)
*B29L 31/30* (2006.01)

(52) U.S. Cl.
CPC .... B29C 45/1418 (2013.01); B29C 45/14811 (2013.01); B32B 5/022 (2013.01); B32B 27/00 (2013.01); *B29L 2031/3005* (2013.01); *B32B 2260/021* (2013.01); *B32B 2260/046* (2013.01); *B32B 2307/4023* (2013.01); *B32B 2451/00* (2013.01); *B32B 2457/00* (2013.01)

(58) Field of Classification Search
CPC .......... B32B 2260/046; B32B 2457/00; B32B 2451/00; B32B 29/02
See application file for complete search history.

(56) References Cited

U.S. PATENT DOCUMENTS

2009/0174121 A1* 7/2009 Hayes ................ B29C 45/1671
264/261
2012/0237723 A1* 9/2012 Wada ................ B29C 45/14811
428/138

FOREIGN PATENT DOCUMENTS

| JP | 2002326319 A | * 11/2002 |
|----|--------------|-----------|
| JP | 2013-252685 | 12/2013 |
| JP | 2014-223780 | 12/2014 |

* cited by examiner

DECORATIVE HOUSING AND MANUFACTURING DEVICE FOR SAME

TECHNICAL FIELD

The present technology relates to a decorative housing and a manufacturing device for the decorative housing, in particular, relates to a decorative housing including a decorative layer laminated onto a substrate resin layer and a manufacturing device for the decorative housing.

BACKGROUND ART

In the technical field of housings of electronic apparatuses, home appliances, and the like and housings of car interior components, the housing may include, for example, a black resin layer from which characters, symbols, or patterns are cut out; and two transparent plastic layers bonded to respective surfaces of the resin layer. For example, symbols or pattern portions may be formed as operation portions such as switches to be depressed by a user.

FIG. 4 is a perspective view illustrating a housing of a home appliance operating unit. FIG. 5 is a cross-sectional view taken along line V-V in FIG. 4.

In FIG. 4 and FIG. 5, a housing 50 of a home appliance operating unit is shaped like an inverted tray and includes a black resin layer 51 from which a window 54 used as a pattern, characters 55 such as AT, and symbols 56, for example, a circle and a square, are cut out; and two transparent plastic layers 52 and 53 bonded to respective surfaces of the resin layer 51.

Portions of the housing 50 corresponding to the symbols 56, for example, the circle and the square, include appropriate built-in wiring to constitute switch portions. For example, a symbol 56 portion corresponding to the circle constitutes a power-on/off switch, and another symbol 56 portion corresponding to the square constitutes a stop switch.

However, the housing in FIG. 4 has a requirement that a front surface layer is transparent and is precluded from including a decorative layer including a figure and a textile that are opaque.

SUMMARY

The present technology provides a decorative housing of a resin molding, the decorative housing allowing characters, symbols, or patterns to transmit light even in a case where a front surface layer includes a decorative layer including a wood and a textile that are opaque, and an object of the present technology is also to provide a manufacturing device for the decorative housing.

A decorative housing may include a decorative layer, a non-woven cloth layer bonded to the decorative layer via a bonding resin layer, and a substrate resin layer fixed to the decorative layer while infiltrating gaps between fibers in the non-woven cloth layer. A colored coating film with a cutout pattern is formed on one of a back surface of the decorative layer and a front surface or both surfaces of the non-woven cloth layer.

A decorative housing may include a decorative layer, a non-woven cloth layer with color bonded to the decorative layer via a bonding resin layer, and a substrate resin layer fixed to the decorative layer while infiltrating gaps between fibers in the non-woven cloth layer. A cutout pattern is formed on the non-woven cloth layer.

A manufacturing device for manufacturing a decorative housing is also provided.

According to the present technology, even in a case where a front surface layer in a resin molding includes a decorative layer including a wood and a textile that are opaque, characters, symbols, or patterns are allowed to transmit light.

DETAILED DESCRIPTION

The present technology will be described below in detail with reference to the drawings.

Figure 1:
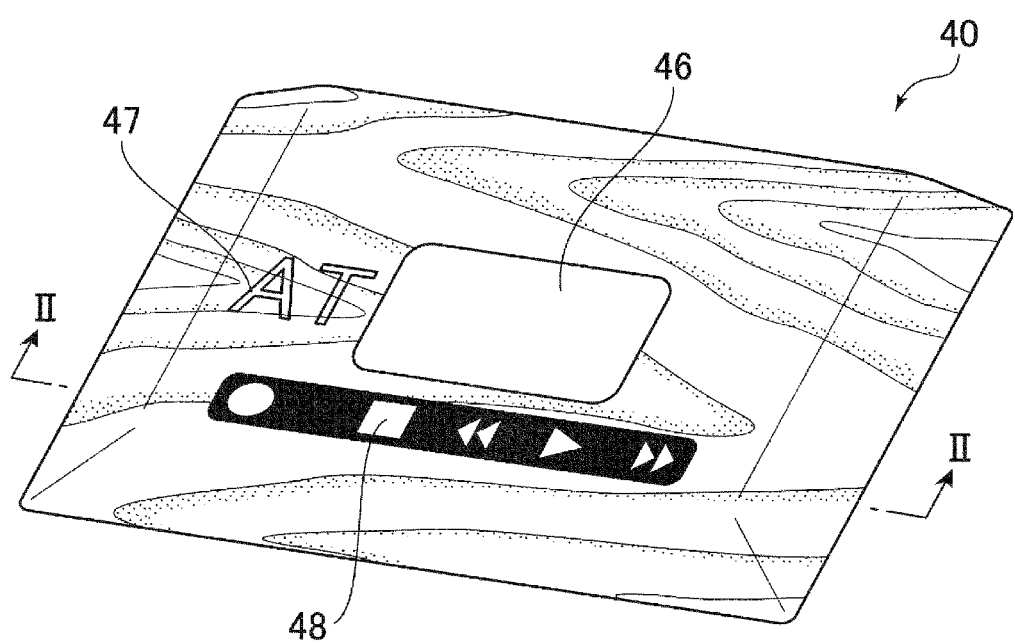
FIG. 1 is a perspective view of an appearance of a decorative housing according to an embodiment of the present technology.
Figure 2:
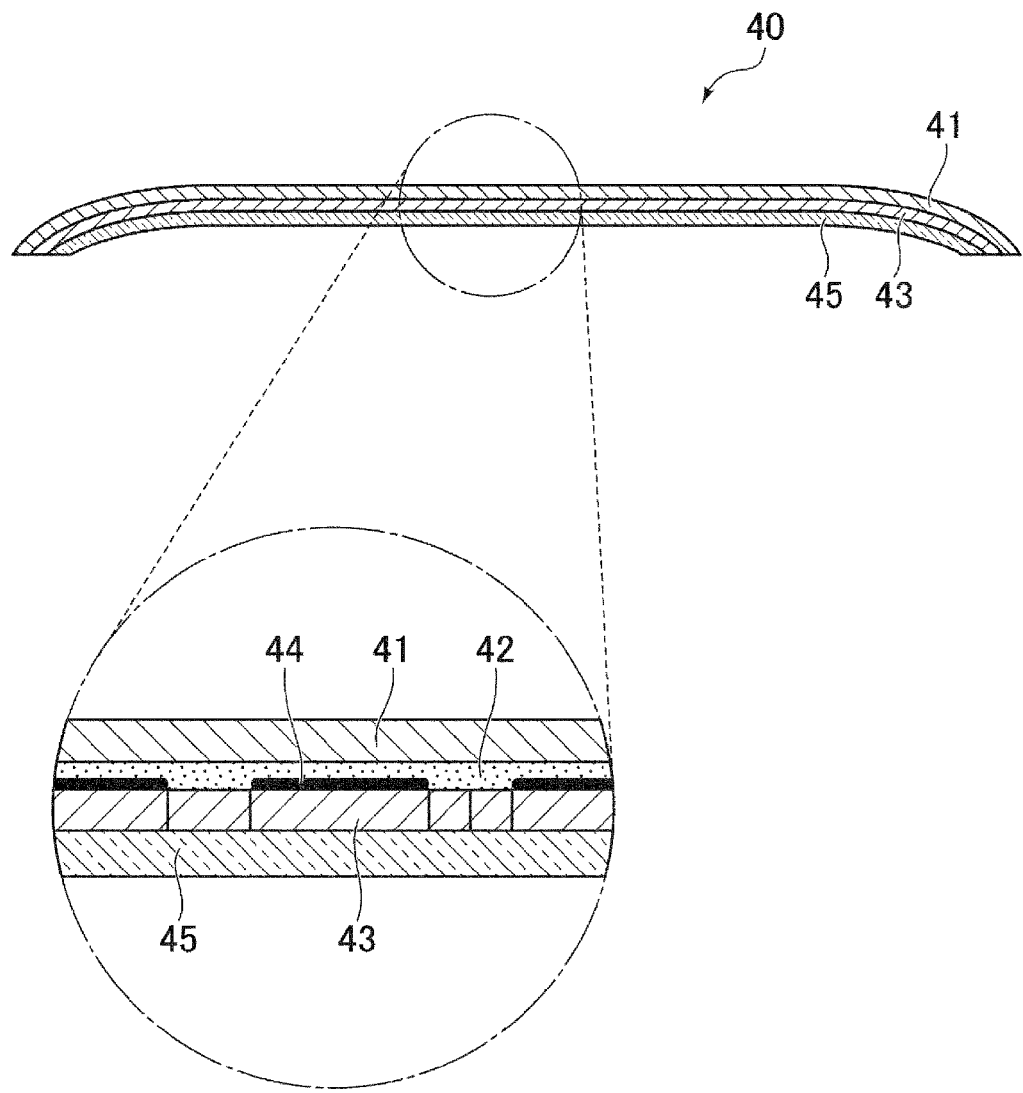
FIG. 2 is a cross-sectional view of the decorative housing taken along line II-II in FIG. 1.

FIG. 1 is a perspective view of an appearance of a decorative housing that is a decorative layer/resin laminate structure according to an embodiment of the present technology. FIG. 2 is a cross-sectional view of the decorative housing taken along line II-II in FIG. 1.

In FIG. 1 and FIG. 2, a housing 40 included in a home appliance operating unit and used as a decorative housing according to an embodiment of the present technology is shaped like an inverted tray, and the housing 40 includes a wood layer 41 used as a decorative layer, a non-woven cloth layer 43 bonded to the wood layer 41 via a bonding resin layer 42, and a substrate resin layer 45 fixed to the wood layer 41 with resin melted in gaps between fibers in the non-woven cloth layer 43.

A predetermined cutout pattern is formed on a colored coating film 44 (black ink film in the present embodiment) applied to a front surface of the non-woven cloth layer 43. The colored coating film may be formed only on the front surface of the non-woven cloth layer 43 as in the present embodiment, but the colored coating film may be formed on both sides of the non-woven cloth layer 43. Furthermore, the colored coating film may be formed on a back surface of the wood layer 41.

In FIG. 1, characters 47 such as AT and symbols 48, for example, a circle and a square, constitute the cutout pattern.

Portions of the housing in FIG. 1 corresponding to the symbols 48, for example, the circle and the square, include appropriate built-in wiring to constitute switch portions to be pressed by a user. For example, a symbol 48 portion corresponding to the circle constitutes a power-on/off switch, and another symbol 48 portion corresponding to the square constitutes a stop switch.

The bonding resin layer 42 includes a polyvinyl acetal-based resin having thermoplasticity and a viscosity sufficient to soften the bonding resin layer 42 to release bubbles in the bonding resin layer 42 when the housing 40 is molded.

The polyvinyl acetal resin is obtained by acetalizing a polyvinyl alcohol (PVA) resin using aldehyde and, in particular, is preferably polyvinyl butyral (PVB) butylaldehyde.

The bonding resin layer 42 is formed by applying (spraying) a solution of a heated and melted bonding resin to the non-woven cloth layer 43. The bonding resin layer 42 may also be formed by applying (spraying) a solution of a heated and melted bonding resin to the wood layer 41. The bonding resin layer 42 may be formed by placing a PVB film between the wood layer 41 and the bonding resin layer 42.

The PVB resin may contain a plasticizer in order to apply flexibility to the bonding resin layer 42. Any type of plasticizer may be used. Examples of the plasticizer include monobasic organic acid esters such as triethylene glycol di-2-ester ethylhexanoate, triethylene glycol di-2-ester ethylbutyrate, and triethylene glycol di-n-ester octylate; polybasic organic acid esters such as ester dibutylsebacate and ester dioctylazelate; and polyglycerin derivatives such as polyoxypropylene polyglycel ether and polyethylene glycol polyglyceril ether.

Furthermore, the bonding resin layer 42 may include a resin selected from the group including a polyvinylacetal-based resin, an ethylene/vinyl acetate copolymer-based resin, an ethylene/acrylic copolymer-based resin, a propylene-based resin, a propylene/1-butene copolymer-based resin, a propylene/isobutene copolymer-based resin, a styrene/propylene/isobutene copolymer-based resin, styrene/isoprene copolymer-based resin, a styrene/isoprene/isobutene copolymer-based resin, and a styrene/isoprene/butene copolymer-based resin.

The non-woven cloth layer 43 includes a spunbond-based non-woven cloth or a paper-based non-woven cloth containing polyester (specifically, PY-120 manufactured by AWA PAPER & TECHNOLOGICAL COMPANY, inc.). The non-woven cloth layer 43 has a thickness of from 50 to 1000 μm.

Specifically, each of the fibers of the non-woven cloth layer 43 has a thickness of from 1 to 50 μm and a length of from 1 to 50 mm and preferably from 2 to 15 mm.

The fibers of the non-woven cloth layer 43 include at least one selected from the group including polyester, polyamide, polypropylene, polyethylene, acrylic, polyacetal, and polycarbonate, and preferably include polyester.

Figure 3:
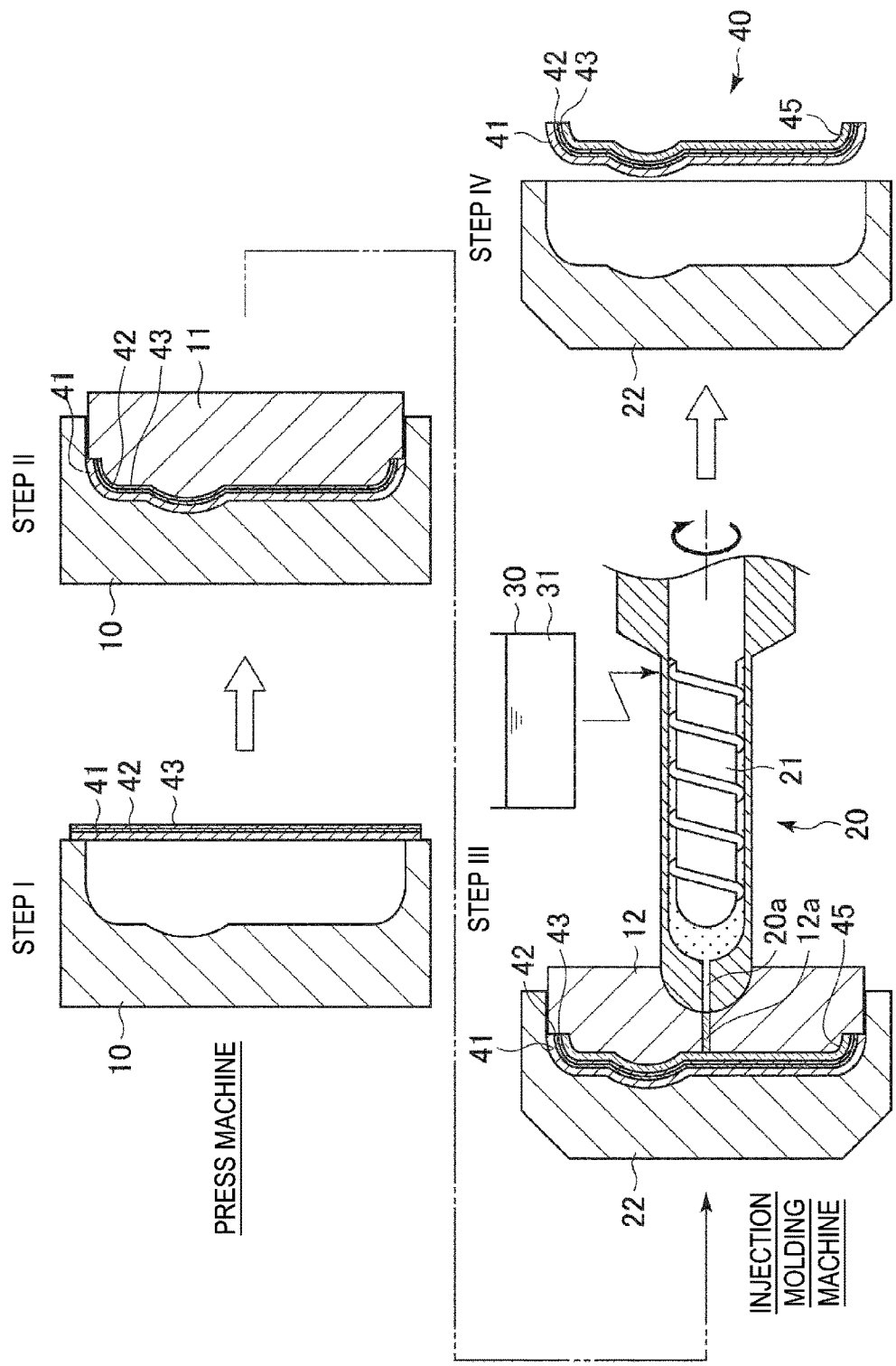
FIG. 3 is a diagram illustrating a manufacturing device for a decorative housing according to an embodiment of the present technology.

The substrate resin layer 45 includes a resin that transmits light, in other words, a light-transmissive thermoplastic resin and preferably a synthetic resin for injection molding. Specifically, the substrate resin layer includes one material selected from the group including polymethyl methacrylate (PMMA), a transparent acrylnitrile/butadiene/styrene copolymer (ABS), polycarbonate (PC), and ABS+PC; and preferably PMMA. The thickness of the substrate resin layer 45 is optionally set according to the product and is approximately 1.2 mm in the present embodiment. A molten resin of the substrate resin layer 45 is heated and melted by an injection molding machine 20 in FIG. 3 described below. The wood layer 41 and the non-woven cloth layer 43 bonded together by the bonding resin layer 42 mounted in a female mold 22 in FIG. 3 described below. The molten resin is injected into the female mold 22 and infiltrates the gaps between the fibers of the wood layer 41 for fixation (FIG. 3). When the molten resin of the substrate resin layer 45 is cooled and solidified, the non-woven cloth layer 43 is shrunk and more firmly fixed to the substrate resin layer 45.

According to the housing 40 in FIG. 1, even in a case where a front surface layer in a resin molding includes a decorative layer including a wood and a textile that are opaque, light is allowed to be transmitted through characters, symbols, or patterns.

A transparent acrylic layer may be bonded to the front surface of the wood layer 41.

The decorative layer may be a textile layer including a textile including a fiber product such as a fabric, a non-woven cloth, or knitting. Examples of the textile include a polyester fabric, a non-woven cloth, knitting, and lace.

FIG. 3 is a diagram illustrating a manufacturing device for a decorative housing according to an embodiment of the present technology.

As illustrated in FIG. 3, a press machine is used to execute steps I and II, and an injection molding machine is used to steps III and IV. Finally, an appropriate method is used to execute step V described below.

A laminate is prepared that includes the wood layer 41 and the non-woven cloth layer 43 bonded to the wood layer 41 via the bonding resin layer 42. The laminate includes a cutout pattern formed on one of a back surface of the wood layer 41 and a front surface or both surfaces of the non-woven cloth layer 43 using a colored coating film.

The bonding resin layer 42 is formed by applying (spraying) a heated melt of a bonding resin to the non-woven cloth layer 43. The bonding resin layer 42 may also be formed by applying (spraying) a heated melt of the bonding resin to the textile layer 41. The bonding resin layer 42 may also be formed by placing a PVB film between the wood layer 41 and the bonding resin layer 42.

The bonding resin constituting the bonding resin layer 42 is PVB, which is heated at from 150 to 250° C. and preferably at approximately 200° C. and melted to fix the wood layer 41 and the non-woven cloth layer 43 to each other.

Figure 4:
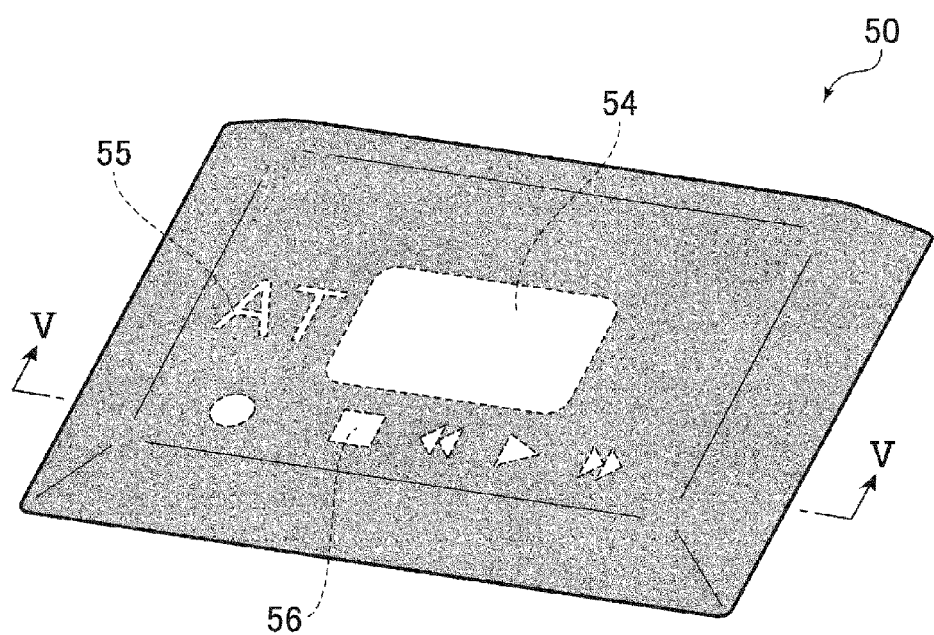
FIG. 4 is a perspective view of an appearance of a housing of a home appliance operating unit in the related art.
Figure 5:
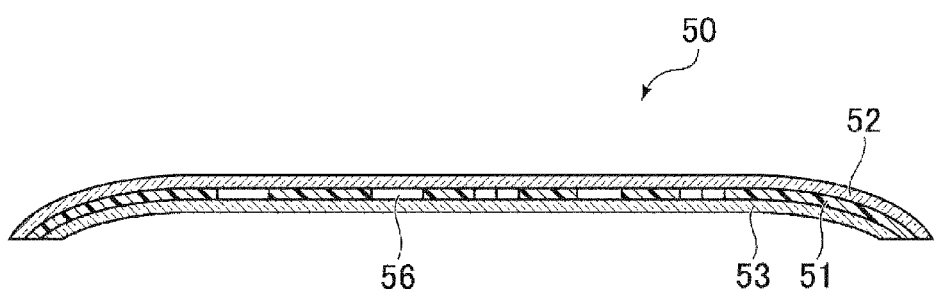
FIG. 5 is a cross-sectional view of the housing taken along line V-V in FIG. 4.

In step I in FIG. 4, the laminate of the wood layer 41, the bonding resin layer 42, and the non-woven cloth layer 43 is placed on a female mold 10 (fixed mold) of the press machine with the non-woven cloth layer 43 facing upward. The laminate may be preliminarily cut into a predetermined shape.

Then, in step II, a male mold 11 (movable mold) of the press machine is moved toward the female mold to push, into the female mold 10, the laminate of the wood layer 41, the bonding resin layer 42, and the non-woven cloth layer 43 placed on the female mold 10 in step I. In this manner, the laminate is molded into a shape defined by the female mold 10 and the male mold 11, and then the molded laminate is taken out of the press machine. At this time, the periphery of the molded laminate may be deburred by cutting using a laser cutter or a cutting mold (cutting unit).

Subsequently, in step III in FIG. 4, the laminate molded by the press machine is mounted in the female mold 22 (a second fixed mold) with the non-woven cloth layer 43 facing upward. An injection molding male mold 12 (injection mold) is moved toward the laminate disposed in the female mold 22. An injection hole 20a of the injection machine 20 is pressed against an injection molding hole 12a of the injection molding male mold 12. An injection screw 21 is rotated clockwise to inject a molten resin 31 of the substrate resin layer 45 in a tank 30 into a space (cavity) defined by the laminate and the injection molding male mold 12. At this time, the molten resin 31 of the substrate resin layer 45 infiltrates the gaps between the fibers of the non-woven cloth layer 43 and sticks to the fibers. This improves bondability between the non-woven cloth layer 43 and the substrate resin layer 45; and mechanical strength of the housing 40.

Then, in step IV, the injection-molded substrate resin layer 45 is cooled and solidified, and then the injection machine 20 and the injection molding male mold 12 are separated from the female mold 22. A molding is taken out of the female mold 22.

The female mold 10 and the male mold 11 constitute the press machine. The female mold 22, the injection molding male mold 12, and the injection machine 20 constitute the injection molding machine. The press machine and the injection molding machine constitute a manufacturing device for the housing 40. In a modified example, the press machine and the injection molding machine may be integrated together, and the female mold 10 may be used as the female mold 22. In this case, the injection molding male mold 12 is moved toward the laminate of the wood layer 41 and the non-woven cloth layer 43 molded in the female mold 10.

In a modified example of the decorative housing 40 according to the embodiment of the present technology, instead of the colored coating film 44 formed on the front surface or both surfaces of the non-woven cloth layer 43 or formed on the back surface of the wood layer 41, a colored non-woven cloth layer may be used that is bonded to the wood layer 41 via the bonding resin layer 42 and on which a cutout pattern is formed. The configuration and effects of the decorative housing and the manufacturing device for the decorative housing are as described above.

In the embodiment of the present technology, the decorative housing 40 is described simply as a common housing. However, in applicable technical fields of the embodiment of the present technology, the embodiment is directed to decorative articles formed by in-mold molding and including a surface coating layer. Specific examples of the decorative housing include housings of sundry articles including containers and stationeries; housings of electronic apparatuses and home appliances including cell phones and notebook personal computers; housings of interior and exterior components of buildings and cars; and interior housings of airplanes, railroad vehicles, and ships.

The invention claimed is:

1. A decorative housing, comprising:
   a decorative layer which is opaque;
   a non-woven cloth layer bonded to the decorative layer via a bonding resin layer; and
   a substrate resin layer fixed to the decorative layer while infiltrating gaps between fibers in the non-woven cloth layer, wherein
   a colored coating film with a cutout pattern is formed on a front surface or both surfaces of the non-woven cloth layer,
   the bonding resin layer comprises a resin selected from the group consisting of a polyvinyl acetal-based resin and an ethylene/acrylic copolymer-based resin, and
   the non-woven cloth layer has a thickness of from 50 to 1000 μm, and each of fibers of the non-woven cloth layer have a thickness of from 1 to 50 μm and a length of from 2 to 15 mm.

2. The decorative housing according to claim 1, wherein the decorative layer includes at least one of a wood layer or a textile layer.

3. The decorative housing according to claim 2, wherein the cutout pattern includes a character, a symbol, or a pattern.

4. The decorative housing according to claim 1, wherein the cutout pattern includes a character, a symbol, or a pattern.

5. The decorative housing according to claim 1, further comprising appropriate wiring such that a portion of the cutout pattern includes a switch.

6. The decorative housing according to claim 1, wherein the substrate resin layer is a light-transmissive thermoplastic resin.

7. The decorative housing according to claim 6, wherein the light-transmissive thermoplastic resin is a synthetic resin for injection molding.

8. The decorative housing according to claim 7, wherein the synthetic resin for injection molding comprises a material selected from a group consisting of PMMA, transparent ABS, PC, and PC+ABS.

9. The decorative housing according to claim 1, wherein the cutout pattern includes a plurality of characters, symbols, or patterns.

* * * * *